United States Patent
Kim et al.

(10) Patent No.: US 10,630,365 B2
(45) Date of Patent: Apr. 21, 2020

(54) METHOD FOR TRANSMITTING AND RECEIVING CHANNEL STATE INFORMATION BETWEEN BASE STATION AND TERMINAL IN WIRELESS COMMUNICATION SYSTEM AND APPARATUS FOR SUPPORTING SAME

(71) Applicant: LG ELECTRONICS INC., Seoul (KR)

(72) Inventors: Kijun Kim, Seoul (KR); Hyungtae Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/082,919

(22) PCT Filed: Mar. 6, 2017

(86) PCT No.: PCT/KR2017/002376
§ 371 (c)(1),
(2) Date: Sep. 6, 2018

(87) PCT Pub. No.: WO2017/155257
PCT Pub. Date: Sep. 14, 2017

(65) Prior Publication Data
US 2019/0081677 A1    Mar. 14, 2019

Related U.S. Application Data

(60) Provisional application No. 62/304,912, filed on Mar. 7, 2016.

(51) Int. Cl.
*H04B 7/06* (2006.01)
*H04B 5/00* (2006.01)
(Continued)

(52) U.S. Cl.
CPC ........ *H04B 7/0626* (2013.01); *H04B 7/0456* (2013.01); *H04B 7/0617* (2013.01);
(Continued)

(58) Field of Classification Search
CPC ... H04L 5/0048; H04L 5/0035; H04L 5/0057; H04L 5/0053; H04L 5/001; H04L 5/0023;
(Continued)

(56) References Cited

U.S. PATENT DOCUMENTS 9,681,425 B2 *   6/2017  Geirhofer ............ H04B 7/0621
10,084,579 B2 *  9/2018  Nam ..................... H04W 72/046
(Continued)

OTHER PUBLICATIONS

PCT International Application No. PCT/KR2017/002376, Written Opinion of the International Searching Authority dated Jun. 23, 2017, 20 pages.
(Continued)

*Primary Examiner* — Un C Cho
*Assistant Examiner* — Rasha K Fayed
(74) *Attorney, Agent, or Firm* — Lee Hong Degerman Kang Waimey

(57) ABSTRACT

Disclosed are a method for transmitting and receiving channel state information between a base station and a terminal and an apparatus for supporting the same. Specifically, disclosed is a method for reporting channel state information of a specific terminal in order to determine an optimal antenna port setting (number, index, etc.) for transmitting, by a base station, a data signal to the terminal. More particularly, disclosed are a method for reporting, by a terminal, channel state information on different antenna port settings (number, index, etc.) to a base station and an apparatus for supporting the same.

9 Claims, 10 Drawing Sheets

(51) Int. Cl.
  *H04B 7/0456* (2017.01)
  *H04B 7/0452* (2017.01)
  *H04L 5/00* (2006.01)
(52) U.S. Cl.
  CPC ......... *H04B 7/0632* (2013.01); *H04B 7/0639* (2013.01); *H04B 7/0695* (2013.01); *H04L 5/0048* (2013.01); *H04B 7/0452* (2013.01)
(58) Field of Classification Search
  CPC ... H04L 5/0037; H04L 5/0094; H04L 5/0007; H04L 5/005; H04L 5/00; H04L 1/0026; H04L 1/0027; H04L 1/0028; H04L 1/06; H04L 1/00; H04L 43/06; H04L 12/189; H04L 12/18; H04L 12/911; H04L 47/824; H04W 72/06; H04W 72/0413; H04W 72/085; H04W 72/042; H04W 72/005; H04W 72/046; H04W 72/12; H04W 72/04; H04W 72/1273; H04W 72/0473; H04W 72/0446; H04W 72/0453; H04W 72/0406; H04W 24/10; H04W 4/025; H04W 4/06; H04W 28/18; H04W 74/00; H04W 74/006; H04B 7/0626; H04B 7/0456; H04B 7/0617; H04B 7/0632; H04B 7/0639; H04B 7/0695; H04B 7/0452; H04B 7/024; H04B 7/0647; H04B 7/2612; H04B 7/063; H04B 7/0619; H04B 7/0413; H04B 7/0417; H04B 7/0426; H04B 7/06; H04B 7/04; H04B 17/24
  See application file for complete search history.

(56) References Cited

U.S. PATENT DOCUMENTS

| | | | |
|---|---|---|---|
| 2013/0301432 A1* | 11/2013 | Hammarwall | H04W 24/02 370/252 |
| 2013/0322376 A1* | 12/2013 | Marinier | H04B 7/2612 370/329 |
| 2013/0336214 A1* | 12/2013 | Sayana | H04B 7/024 370/328 |
| 2015/0009928 A1 | 1/2015 | Sohn et al. | |
| 2016/0080052 A1* | 3/2016 | Li | H04B 7/0456 375/267 |
| 2018/0278437 A1* | 9/2018 | Davydov | H04L 5/005 |

OTHER PUBLICATIONS

Huawei, et al., "Correction on Class B CSI reporting in TS 36.213", 3GPP TSG RAN WG1 Meeting #84, R1-161040, Feb. 2016, 12 pages.

Huawei, "Introduction of EB/FD-MIMO", 3GPP TSG RAN WG1 Meeting #83, R1-157917, Nov. 2015, 55 pages.

LG Electronics, "Discussion on periodic feedback for CoMP", 3GPP TSG RAN WG1 Meeting #70, R1-123516, Aug. 2012, 4 pages.

* cited by examiner

FIG. 11
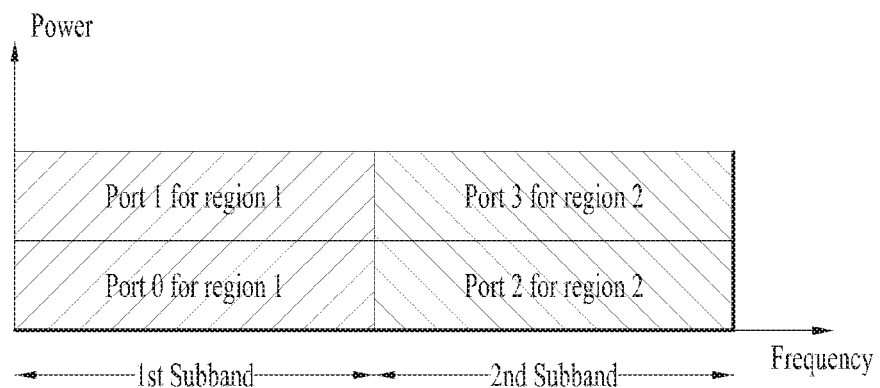
FIG. 12
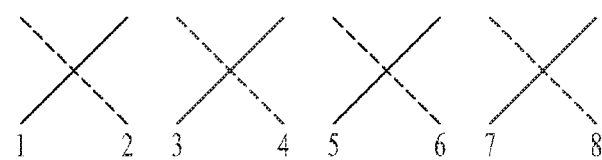
(a)
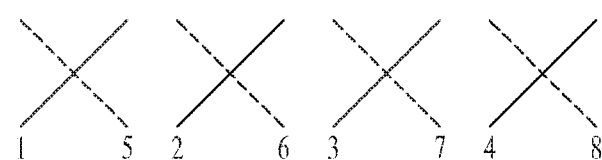
(b)

METHOD FOR TRANSMITTING AND RECEIVING CHANNEL STATE INFORMATION BETWEEN BASE STATION AND TERMINAL IN WIRELESS COMMUNICATION SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2017/002376, filed on Mar. 6, 2017, which claims the benefit of U.S. Provisional Application No. 62/304,912, filed on Mar. 7, 2016, the contents of which are all hereby incorporated by reference herein in their entireties.

TECHNICAL FIELD

The following description relates to a wireless communication system and, more particularly, to a method of transmitting and receiving channel state information between a user equipment (UE) and a base station in a wireless communication system, and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method of reporting channel state information at a user equipment (UE) such that a base station using a plurality of antenna ports determines antenna port configurations (number, index, etc.) for efficiently transmitting a data signal to a specific UE.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method and apparatuses for transmitting and receiving channel state information between a base station and a user equipment (UE) in a wireless communication system.

The object of the present invention can be achieved by providing a method of, at a user equipment (UE), reporting channel state information (CSI) to a base station in a wireless communication system including receiving configuration information of a first CSI process indicating first CSI for N (N being a natural number greater than 1) antenna ports and a second CSI process indicating second CSI for some of the N antenna ports from the base station, calculating the first CSI and the second CSI based on the first CSI process and the second CSI process, and reporting the first CSI and the second CSI to the base station.

In another aspect of the present invention, provided herein is a user equipment (UE) for reporting channel state information (CSI) to a base station in a wireless communication system including a transmitter, a receiver, and a processor connected to the transmitter and the receiver to operate. The processor is configured to receive configuration information of a first CSI process indicating first CSI for N (N being a natural number greater than 1) antenna ports and a second CSI process indicating second CSI for some of the N antenna ports from the base station, to calculate the first CSI and the second CSI based on the first CSI process and the second CSI process and to report the first CSI and the second CSI to the base station.

For example, the first CSI process and the second CSI process may share the same CSI-reference signal (RS) resources.

As another example, the first CSI process and the second CSI process may share the same CSI-reference signal (RS) resources and CSI-interference measurement (IM) resources.

In addition, ratios of physical downlink shared channel (PDSCH) energy per resource element (EPRE) to CSI-RS EPRE applied to the first CSI process and the second CSI process may be different from each other.

In addition, the second CSI process may indicate second CSI for N/2 of the N antenna ports, and the N/2 antenna ports may include the equal numbers of slash ports and backslash ports among cross-polarization antennas.

The calculating of the first CSI and the second CSI based on the first CSI process and the second CSI process may include independently calculating a rank indicator (RI), a precoding matrix indicator (PMI) and a channel quality indicator (CQI) according to CSI process.

The calculating of the first CSI and the second CSI based on the first CSI process and the second CSI process may include calculating a common rank indicator (RI) with respect to the first CSI process and the second CSI process and independently calculating a precoding matrix indicator (PMI) and a channel quality indicator (CQI) according to CSI process.

The method may further include receiving configuration information of a third CSI process indicating third CSI for some of the N antenna ports from the base station, calculating the third CSI based on the third CSI process, and reporting the third CSI to the base station. At this time, antenna ports corresponding to the second CSI process and the third CSI process may be different from each other.

In another aspect of the present invention, provided herein is a method of, at a base station, receiving channel state information (CSI) from a user equipment (UE) in a wireless communication system including transmitting configuration information of a first CSI process indicating first CSI for N (N being a natural number greater than 1) antenna ports and a second CSI process indicating second CSI for some of the N antenna ports to the UE and receiving the first CSI and the second CSI from the UE.

In another aspect of the present invention, provided herein is a base station for receiving channel state information (CSI) from a user equipment (UE) in a wireless communication system including a transmitter, a receiver, and a processor connected to the transmitter and the receiver to operate. At this time, the processor is configured to transmit configuration information of a first CSI process indicating first CSI for N (N being a natural number greater than 1) antenna ports and a second CSI process indicating second CSI for some of the N antenna ports to the UE and to receive the first CSI and the second CSI from the UE.

At this time, the number of antenna ports for transmitting a physical downlink shared channel (PDSCH) to the UE may be determined based on the first CSI and the second CSI.

The aspects of the present invention are only a part of the preferred embodiments of the present invention, and various embodiments based on technical features of the present invention may be devised and understood by the person with ordinary skill in the art based on the detailed description of the present invention.

Advantageous Effects

As is apparent from the above description, the embodiments of the present disclosure have the following effects.

According to the present invention, a base station for transmitting a data signal using a plurality of antenna ports can determine optimal antenna port configurations (number, index, etc.) for transmitting the data signal to a specific UE.

At this time, the base station may serve UEs located in different directions according to the determined optimal antenna port configurations.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 11 a view showing another example of a service region of each TXRU according to the present invention;

FIG. 12 is a view showing an example of antenna port indexing in a cross-polarization antenna.

BEST MODE

Figure 1:
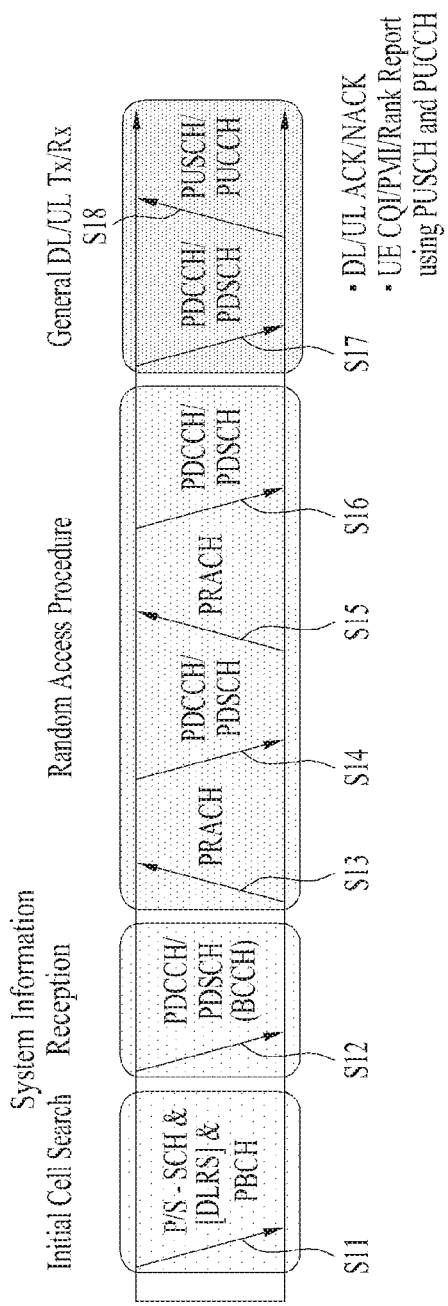
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
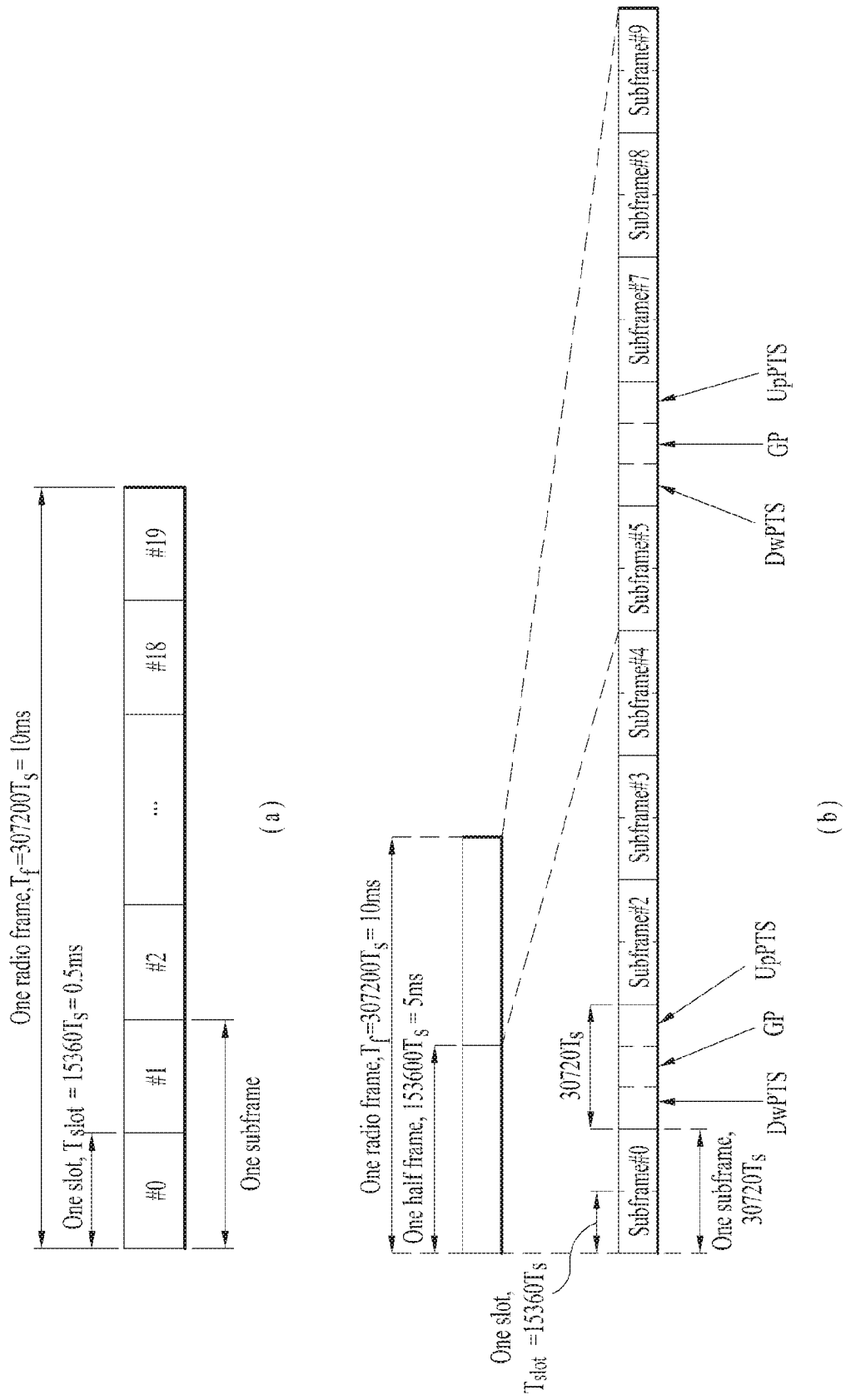
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
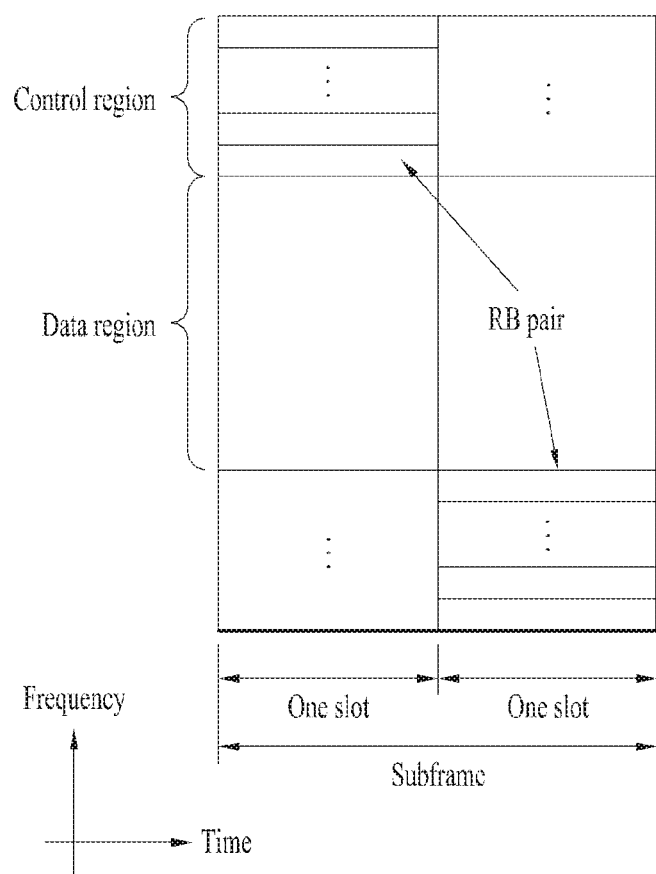
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
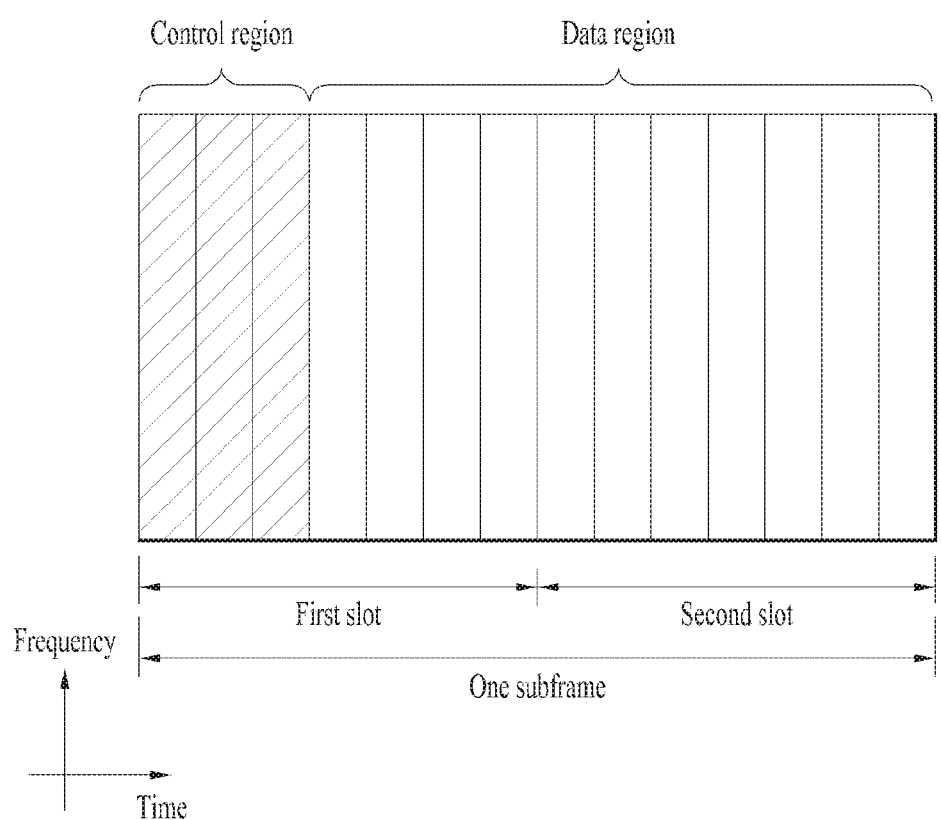
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As more and more communication devices require greater communication capacity, there is a need for mobile broad-

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
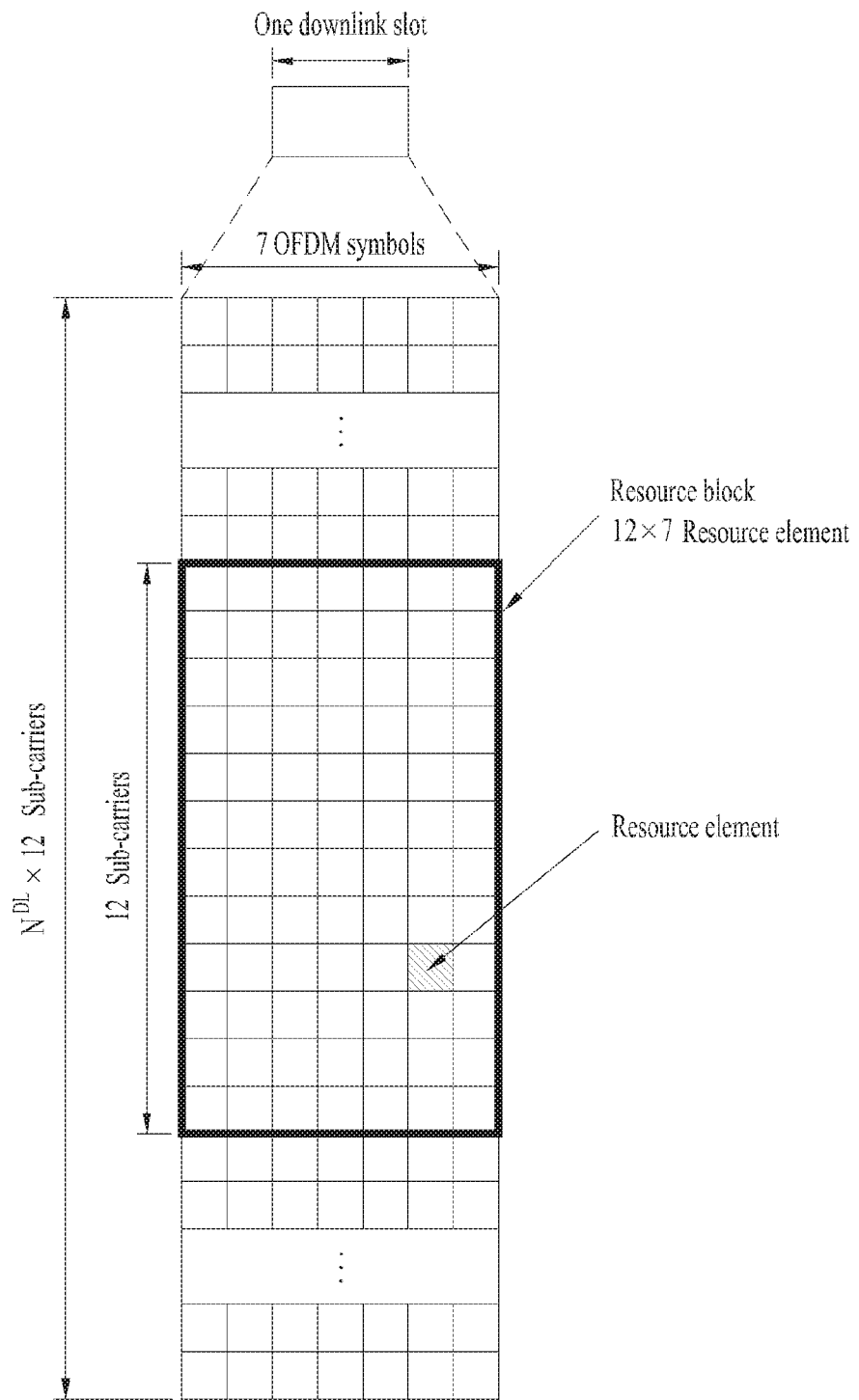
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 band communication enhanced over existing radio access technology (RAT). Massive Machine-Type Communications (MTC), which provides a variety of services by connecting multiple devices and objects anywhere and anytime, is also considered. In addition, communication system design considering services/UEs sensitive to reliability and latency is also under discussion.

Thus, introduction of a new radio access technology considering enhanced mobile broadband communication, massive MTC, and Ultra-Reliable and Low Latency Communication (URLLC) is being discussed. In the present invention, for simplicity, this technology will be referred to as New RAT.

2.1. Self-Contained Subframe Structure

Figure 6:
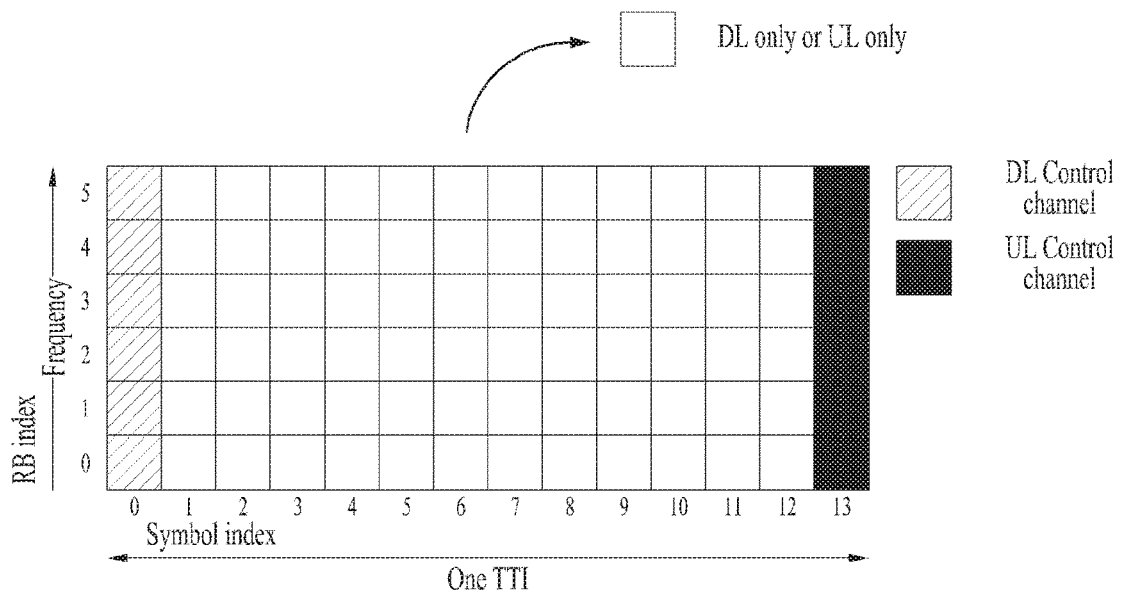
FIG. 6 is a diagram illustrating a self-contained subframe structure applicable to the present invention.

FIG. 6 is a diagram illustrating a self-contained subframe structure applicable to the present invention.

In the New RAT system to which the present invention is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain time length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone as shown in FIG. 6.

For simplicity of explanation, the frame structure configured as above is referred to as a subframe, but this configuration can also be referred to as a frame or a slot. For example, in the New RAT system, one unit consisting of a plurality of symbols may be referred to as a slot. In the following description, a subframe or a frame may be replaced with the slot described above.

2.2. OFDM Numerology

The New RAT system uses the OFDM transmission scheme or a similar transmission scheme. Here, the New RAT system may typically have the OFDM numerology as shown in Table 2.

TABLE 2

| Parameter | Value |
|---|---|
| Subcarrier-spacing ($\Delta f$) | 75 kHz |
| OFDM symbol length | 13.33 us |
| Cyclic Prefix(CP) length | 1.04 us/ 0.94 μs |
| System BW | 100 MHz |
| No. of available subcarriers | 1200 |
| Subframe length | 0.2 ms |
| Number of OFDM symbol per Subframe | 14 symbols |

Alternatively, the New RAT system may use the OFDM transmission scheme or a similar transmission scheme, and may use an OFDM numerology selected from among multiple OFDM numerologies as shown in Table 3. Specifically, as disclosed in Table 3, the New RAT system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the New RAT system according to the present invention, and the values thereof may vary depending on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the New RAT system according to the present invention, and the values thereof may vary depending on the implementation method.

TABLE 3

| Parameter | Value | Value | Value | Value |
|---|---|---|---|---|
| Subcarrier-spacing ($\Delta f$) | 15 kHz | 30 kHz | 60 kHz | 120 kHz |
| OFDM symbol length | 66.66 | 33.33 | 16.66 | 8.33 |
| Cyclic Prefix(CP) length | 5.20 μs/ 4.69 μs | 2.60 μs/ 2.34 μs | 1.30 μs/ 1.17 μs | 6.51 μs/ 5.86 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
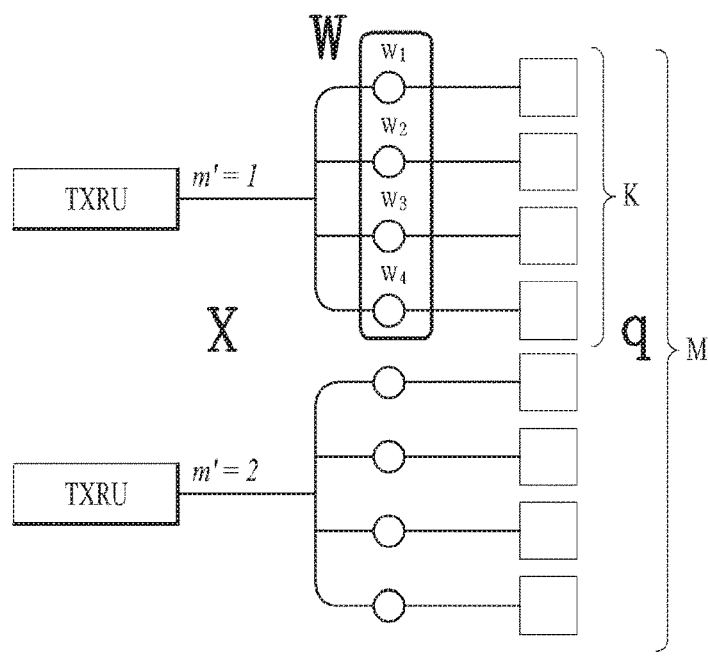
FIGS. 7 and 8 are diagrams illustrating representative methods for connecting TXRUs to antenna elements.
Figure 8:
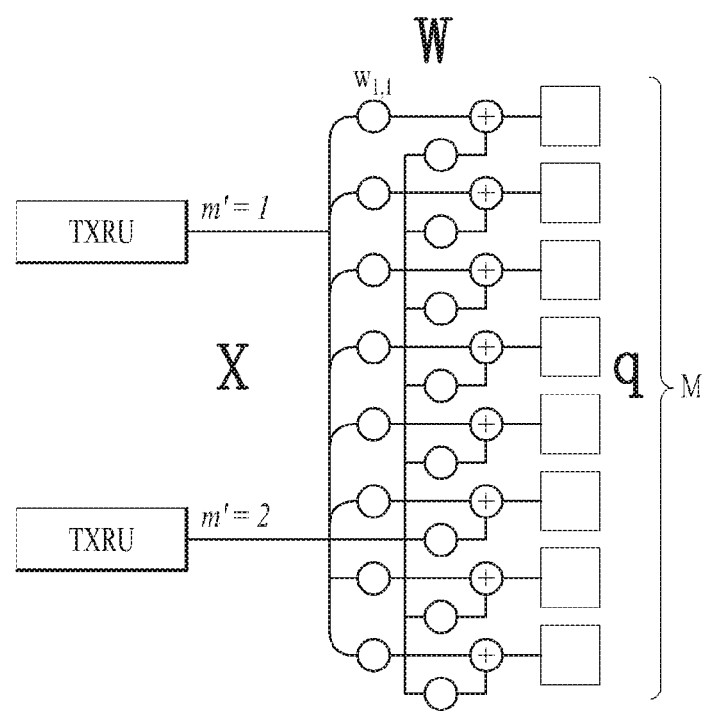

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to subarrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

2.4. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

3. Proposed Embodiment

In a millimeter wave (mmW) system, a base station may transmit a PDSCH only in one analog beam direction at a point in time by analog beamforming. In other words, only a small number of UEs located in a direction corresponding to the analog beam direction may receive data from the base station.

Therefore, the present invention proposes a method of differently setting analog beam directions according to antenna port as necessary and simultaneously transmitting data to a plurality of UEs located in several analog beam directions.

Hereinafter, for example, in a structure in which 256 antenna elements are divided into four equal parts to form four subarrays and a TXRU is connected to each subarray as shown in FIG. 7, the proposed configuration of the present invention will be described in detail.

For example, when each subarray includes a total of 64 (8*8) antenna elements arranged in a two-dimensional form, the subarray may cover a region corresponding to a 15-degree horizontal angle region and a 15-degree vertical angle region by analog beamforming. In this case, the base station may divide a region to be served by the base station into a plurality of regions and provide a service one at a time. In the following description, assume that CSI-RS antenna ports are mapped 1-to-1 to TXRU. Therefore, antenna port and TXRU have the same meaning in the following description.

Figure 9:
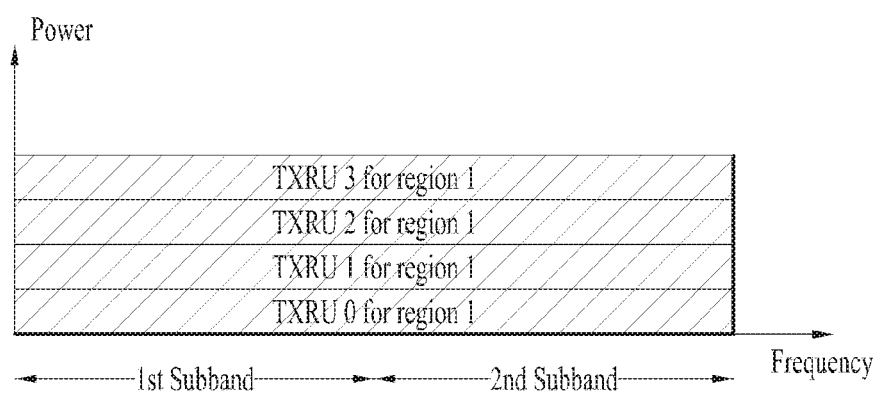
FIG. 9 is a view showing an example of a service region of each TXRU according to the present invention.

FIG. 9 is a view showing an example of a service region of each TXRU according to the present invention.

As shown in FIG. 9, when all TXRUs (antenna ports or subarrays) have the same analog beamforming direction, the base station may form a digital beam having higher resolution, thereby increasing throughput of a corresponding region. In addition, the above configuration may increase rank of data transmitted to the corresponding region, thereby increasing throughput of the corresponding region.

Figure 10:
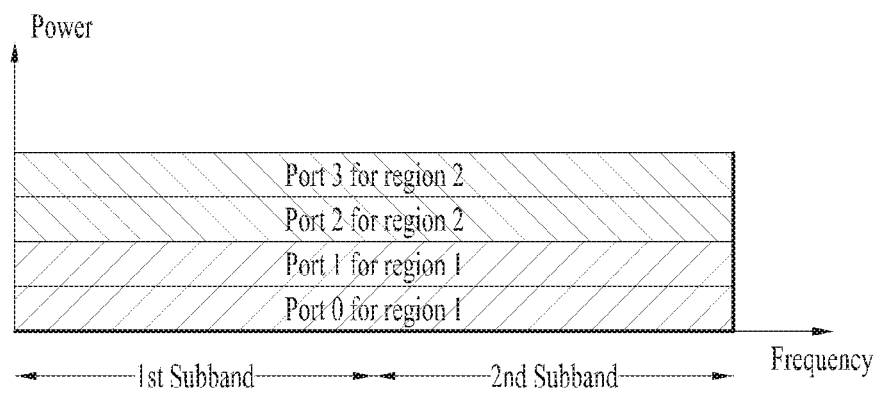
FIG. 10 a view showing another example of a service region of each TXRU according to the present invention.

FIG. 10 a view showing another example of a service region of each TXRU according to the present invention.

As shown in FIG. 10, when TXRUs (antenna ports or subarrays) have different analog beamforming directions, the base station may simultaneously transmit data to UEs distributed in a wider region through a corresponding subframe. For example, as shown in FIG. 10, two of the four antenna ports may be used to transmit a PDSCH to UE1 located in region 1 and the remaining two antenna ports may be used to transmit a PDSCH to UE2 located in region 2.

In particular, in FIG. 10, PDSCH1 transmitted to UE1 and PDSCH2 transmitted to UE2 may be subjected to spatial division multiplexing (SDM) and transmitted.

FIG. 11 a view showing another example of a service region of each TXRU according to the present invention.

As shown in FIG. 11, PDSCH1 transmitted to UE1 and PDSCH2 transmitted to UE2 may be subjected to frequency division multiplexing (FDM) and transmitted.

The configurations shown in FIGS. 10 and 11 will be described in detail. The base station may transmit a specific PDSCH in the full band in FIG. 10 but may transmit a specific PDSCH in a portion of the full band in FIG. 11. Therefore, the base station of FIG. 11 may transmit the specific PDSCH through power boosting.

Using the above-described methods, a method, which is preferred by the base station in order to maximize cell throughput, between a method of serving a region using all antenna ports and a method of dividing antenna ports and simultaneously serving several regions may be changed according to rank and MCS served to the UE. In addition, the method preferred by the base station may be changed according to the amount of data to be transmitted to each UE.

More specifically, the base station according to the present invention calculates cell throughput or a scheduling metric which may be obtained when serving one region using all antenna ports, and calculates cell throughput or a scheduling metric which may be obtained when dividing the antenna ports and serving two or more regions. Subsequently, the base station compares cell throughputs or scheduling metrics capable of being obtained through the respective methods and selects a final transmission method. As a result, the number of antenna ports participating in transmission of the PDSCH is changed SF by SF.

In this case, the base station may calculate transmission MCS of the PDSCH according to the number of antenna ports and receive suitable CSI feedback from the UE in order to reflect the transmission MCS in a scheduling algorithm. Hereinafter, a CSI feedback method of a UE to help scheduling of a base station will be proposed.

3.1. First Method

In the first method of the present invention, a method of, at a base station, configuring a plurality of CSI processes with respect to a UE and feeding back CSI according to process is proposed. At this time, in the first method, the plurality of CSI processes may use the same CSI-RS resources and CSI-IM resources, and for which ports of CSI-RS resources a CSI report is performed may be differently determined according to CSI process.

Table 4 shows a configuration in which three CSI processes applicable to the first method are allocated.

TABLE 4

| CSI process index | CSI-RS port configuration |
| --- | --- |
| 0 | Full ports of CSI-RS (1, . . . , N) |
| 1 | Lower half ports of CSI-RS (1, . . . , N/2) |
| 2 | Upper half ports of CSI-RS (N/2 + 1, . . . , N) |

For example, as shown in Table 4, if three CSI processes are allocated, CSI process 0 performs a CSI report for all antenna ports of N-port CSI-RS resources, CSI process 1 performs a CSI report for first to (n/2)-th antenna ports of N-port CSI-RS resources, and CSI process 2 performs a CSI report for (n/2+1)-th to N-th antenna ports.

That is, CSI process 0 means a CSI process in which, on the assumption that a signal is transmitted through all N ports, the UE decides an RI and a PMI in an N-port codebook and reports CQI to the base station.

In addition, CSI process 1 means a CSI process in which, on the assumption that a signal is transmitted through (n/2) ports having low indices among N ports, the UE decides an RI and a PMI in an N/2-port codebook and reports CQI to the base station.

In addition, CSI process 2 means a CSI process in which, on the assumption that a signal is transmitted through (n/2) ports having high indices among N ports, the UE decides an RI and a PMI in an N/2-port codebook and reports CQI to the base station.

Alternatively, CSI process 1 and CSI process 2 may mean CSI processes in which, on the assumption that a signal is not transmitted through some of the N ports, the UE decides an RI and a PMI and reports CSI to the base station.

Even when the same CSI-RS resources are applied to the CSI processes, a ratio of PDSCH energy per resource element (EPRE) to CSI-RS EPRE considered when the UE decides CSI may be changed according to CSI process.

That is, when the base station configures CSI processes with respect to the UE, the ratio of PDSCH EPRE to CSI-RS EPRE for CSI calculation of each CSI process may be individually set.

As another method, the base station may configure only an offset between the ratios of PDSCH EPRE to CSI-RS EPRE of CSI processes connected to the same CSI-RS resources and the UE may calculate the ratio of PDSCH EPRE to CSI-RS EPRE to be applied substantially through a function value, to which the number of antenna ports used in each CSI process is applied. For example, in the case of a CSI process configured to use N1 of Nt ports, the ratio of PDSCH EPRE to CSI-RS EPRE to be applied in order to decide CSI according to the corresponding CSI process may be given as follows.

PDSCH EPRE to CSI-RS EPRE ratio=
($Nt/N1$)+offset     [Equation 1]

where, EPRE denotes transmission energy per RE of each antenna port. When the PDSCH is transmitted using more antenna ports in the same EPRE, the base station may obtain higher throughput. In other words, when the PDSCH is transmitted through partial antenna ports, the base station should increase the EPRE in order to maintain constant throughput.

For example, EPRE of the case where the base station transmits the PDSCH using only N/2 of N ports to maintain constant throughput is twice that of the case where the base station transmits the PDSCH using N ports. The sum of the energies of all antenna ports used for the base station to transmit the PDSCH may be constantly maintained regardless of the number of selected antenna ports.

As a modification, when the same CSI-RS resources are applied to a plurality of CSI processes, the UE may differently set for which ports of CSI-RS resources a CSI report is performed and for which CSI-IM resources a CSI report is performed according to CSI process.

FIG. 12 is a view showing an example of antenna port indexing in a cross-polarization antenna. FIG. 12(a) shows an example of alternately indexing slash (denoted by "/" in FIG. 12) ports and backslash (denoted by "\" in FIG. 12) ports as port numbers. In particular, FIG. 12(b) shows an example of indexing all slash ports and then indexing all backslash ports.

At this time, when the base station transmits the PDSCH using only partial antenna ports, the base station may mix the slash ports and the backslash ports and transmit the PDSCH, in order to increase the probability of transmitting a high-rank PDSCH. That is, when the base station selects some of N ports for the CSI report, the slash ports and the backslash ports may be mixed in the same ratio. Therefore, when the antenna port numbers are indexed as shown in FIG. 12(b), three CSI processes are allocated to the UE as shown in Table 5.

TABLE 5

| CSI process index | CSI-RS port configuration |
| --- | --- |
| 0 | Full ports of CSI-RS (1, . . . , N) |
| 1 | Lower half ports of CSI-RS (1, . . . , N/4, N/2 + 1, . . . , 3N/4) |
| 2 | Upper half ports of CSI-RS (N/4 + 1, . . . , N/2, 3N/4 + 1, . . . , N) |

Tables 4 and 5 show the example of the CSI process in which CSI for N/2 of N ports is reported. When this configuration is extended, a CSI process may be configured to report CSI for N/4 of N ports as shown in Tables 6 and 7. At this time, the base station may enable the UE to report only some of the CSI processes of Tables 6 and 7, in order to reduce overhead of the CSI report for too many CSI processes.

TABLE 6

| CSI process index | CSI-RS port configuration |
| --- | --- |
| 0 | Full ports of CSI-RS (1, . . . , N) |
| 1 | Lower half ports of CSI-RS (1, . . . , N/2) |
| 2 | Upper half ports of CSI-RS (N/2 + 1, . . . , N) |
| 3 | 1st quarter ports of CSI-RS (1, . . . , N/4) |
| 4 | 2nd quarter ports of CSI-RS (N/4 + 1, . . . , 2N/4) |
| 5 | 3rd quarter ports of CSI-RS (2N/4 + 1, . . . , 3N/4) |
| 6 | 4th quarter ports of CSI-RS (3N/4 + 1, . . . , N) |

TABLE 7

| CSI process index | CSI-RS port configuration |
| --- | --- |
| 0 | Full ports of CSI-RS (1, . . . , N) |
| 1 | Lower half ports of CSI-RS (1, . . . , N/4, N/2 + 1, . . . , 3N/4) |
| 2 | Upper half ports of CSI-RS (N/4 + 1, . . . , N/2, 3N/4 + 1, . . . , N) |
| 3 | 1st quarter ports of CSI-RS (1, . . . , N/8, 4N/8 + 1, . . . , 5N/8) |
| 4 | 2nd quarter ports of CSI-RS (N/8 + 1, . . . , 2N/8, 5N/8 + 1, . . . , 6N/8) |
| 5 | 3rd quarter ports of CSI-RS (2N/8 + 1, . . . , 3N/8, 6N/8 + 1, . . . , 7N/8) |
| 6 | 4th quarter ports of CSI-RS (3N/8 + 1, . . . , 4N/8, 7N/8 + 1, . . . , N) |

In the method of configuring the plurality of CSI processes according to the present invention, the UE may independently decide an RI, a PMI and a CQI according to CSI process and individually report these values to the base station.

Alternatively, as a modification of the above-described method, the UE may commonly set the RI of all CSI processes and report individual PMIs and CQIs according to CSI process. In this case, the RI decided in a first CSI process (for example, a CSI process using full antenna ports of configured CSI-RS resources) is commonly applicable to the other CSI processes.

According to the first method of the present invention, the base station may not set RI period/offset of the other CSI processes (e.g., CSI processes 1 and 2) with respect to the UE and the UE may decide the PMIs and CQIs of the other CSI processes according to the RI value of a recently reported CSI process (e.g., CSI process 0) and report the decided values. At this time, the base station may set whether the RI of a certain CSI process is inherited or whether the RI is individually decided with respect to the UE according to CSI process.

3.2. Second Method

In the second method of the present invention, a method of reporting performance deterioration generated when a PDSCH is transmitted using partial antenna ports is proposed. For example, when a CQI of the case where it is assumed that the PDSCH is transmitted using full antenna ports is CQI_f and a CQI of the case where it is assumed that the PDSCH is transmitted using partial antenna ports is CQI_p, the UE according to the second embodiment of the present invention may report CQI_f and CQI_p. Alternatively, the UE may report (CQI_f–CQI_p) which is a deterioration degree of the CQI in the case of using partial antenna ports to the base station together with CQI_f. Here, the UE may define a difference (CQI_f–CQI_p) between two CQIs as delta_CQI and quantize and report the difference.

Specifically, the UE decides an optimal RANK and PMI on the assumption that full ports of configured CSI-RSs are used for PDSCH transmission. Subsequently, the UE may decide maximum MCS capable of achieving initial transmission 10% block error rate (BLER) by the corresponding RANK and PMI and decide CQI_f corresponding thereto. The UE decides maximum MCS capable of achieving initial transmission 10% BLER when only partial antenna ports are used in a state of applying the corresponding RANK and PMI, and decide CQI_p corresponding thereto. Here, the ratio of PDSCH EPRE to CSI-RS EPRE applied when the UE decides CQI_p may be set differently from the ratio of PDSCH EPRE to CSI-RS EPRE applied when deciding CQI_f.

To this end, the base station may individually set the ratio of PDSCH EPRE to CSI-RS EPRE to be applied to calculate CQI_f and the ratio of PDSCH EPRE to CSI-RS EPRE to be applied to calculate CQI_p when configuring the CSI process with respect to the UE. Alternatively, the ratio of PDSCH EPRE to CSI-RS EPRE applied to calculate CQI using N1 of Nt ports may be decided by Equation 1.

Tables 8 and 9 show delta CQI reported when some (e.g., N/2 or N/4) of N ports are used. At this time, the UE may be configured by the base station to report only some of delta CQIs of Tables 8 and 9, in order to reduce overhead of the CSI report for too many delta CQIs.

In addition, the number of delta CQIs to be reported may be changed according to the reported RANK. For example, if the reported RANK is equal to or greater than N/4, since the RANK cannot be supported by N/4 partial ports, CQI_1Q, CQI_2Q, CQI_3Q and CQI_4Q may not be reported.

TABLE 8

| CSI-RS port configuration | Feedback Information |
| --- | --- |
| Full ports of CSI-RS (1, . . . , N) | RANK, PMI, CQI_f |
| Lower half ports of CSI-RS (1, . . . , N/2) | CQI_1H or (CQI_f- CQI_1H) |
| Upper half ports of CSI-RS (N/2 + 1, . . . , N) | CQI_2H or (CQI_f- CQI_2H) |
| 1st quarter ports of CSI-RS (1, . . . , N/4) | CQI_1Q or (CQI_f- CQI_1Q) |

TABLE 8-continued

| CSI-RS port configuration | Feedback Information |
|---|---|
| 2nd quarter ports of CSI-RS (N/4 + 1, . . . , 2N/4) | CQI_2Q or (CQI_f- CQI_2Q) |
| 3rd quarter ports of CSI-RS (2N/4 + 1, . . . , 3N/4) | CQI_3Q or (CQI_f- CQI_3Q) |
| 4th quarter ports of CSI-RS (3N/4 + 1, . . . , N) | CQI_4Q or (CQI_f- CQI_4Q) |

TABLE 9

| CSI-RS port configuration | Feedback Information |
|---|---|
| Full ports of CSI-RS (1, . . . , N) | RANK, PMI, CQI_f |
| Lower half ports of CSI-RS (1, . . . , N/4, N/2 + 1, . . . , 3N/4) | CQI_1H or (CQI_f- CQI_1H) |
| Upper half ports of CSI-RS (N/4 + 1, . . . , N/2, 3N/4 + 1, . . . , N) | CQI_2H or (CQI_f- CQI_2H) |
| 1st quarter ports of CSI-RS (1, . . . , N/8, 4N/8 + 1, . . . , 5N/8) | CQI_1Q or (CQI_f- CQI_1Q) |
| 2nd quarter ports of CSI-RS (N/8 + 1, . . . , 2N/8, 5N/8 + 1, . . . , 6N/8) | CQI_2Q or (CQI_f- CQI_2Q) |
| 3rd quarter ports of CSI-RS (2N/8 + 1, . . . , 3N/8, 6N/8 + 1, . . . , 7N/8) | CQI_3Q or (CQI_f- CQI_3Q) |
| 4th quarter ports of CSI-RS (3N/8 + 1, . . . , 4N/8, 7N/8 + 1, . . . , N) | CQI_4Q or (CQI_f- CQI_4Q) |

3.3. Third Method

In the third method of the present invention, a method of selecting and reporting one of a plurality of CSI processes at a UE is proposed. In other words, the base station may configure the plurality of CSI processes of Tables 6 and 7 with respect to the UE as in the first method and the UE may select one of the plurality of CSI processes and report CSI corresponding thereto to the base station. This method is conceptually equal to a method of allocating a plurality of CSI-RS port configurations corresponding to each row of Table 6 or 7 with respect to one CSI process and enabling the UE to select one CSI-RS port configuration from among the plurality of CSI-RS port configurations and to report CSI corresponding thereto.

In the present invention, the following methods are applicable in order for the UE to select one of the CSI-RS port configurations.

For example, the UE may decide optimal RANK and PMI of each CSI-RS port configuration, calculate throughput according to maximum MCS capable of achieving initial transmission 10% BLER by the corresponding RANK and PMI, and select a CSI-RS port configuration capable of obtaining maximum throughput. Here, the ratio of PDSCH EPRE to CSI-RS EPRE to be applied to each CSI-RS port configuration may be individually signaled from the base station to the UE through RRC signaling.

As another example, the UE may decide optimal RANK and PMI of each CSI-RS port configuration, calculate throughput according to maximum MCS capable of achieving initial transmission 10% BLER by the corresponding RANK and PMI, and decide throughput modified by imposing a penalty on the calculated throughput. Subsequently, the UE may select a CSI-RS port configuration capable of obtaining the modified maximum throughput. Here, the ratio of PDSCH EPRE to CSI-RS EPRE to be applied to each CSI-RS port configuration may be individually signaled from the base station to the UE through RRC signaling. In addition, the penalty imposed to obtain the modified throughput may be set according to CSI-RS port configuration or RANK and may be signaled from the base station to the UE through RRC signaling.

Here, the ratio of PDSCH EPRE to CSI-RS EPRE influences a finally reported CQI, but the penalty is reflected in selecting the CSI-RS port configuration. When the penalty is imposed according to CSI-RS port configuration and RANK, a bias may be applied such that a preferred CSI-RS port configuration is changed according to RANK. For example, a method of giving priority to 2-port CSI-RS resources in the case of PDSCH transmission corresponding to RANK 1 or 2 and giving priority to 4-port CSI-RS resources in the case of PDSCH transmission of RANK 3 or greater may be used.

Additionally, the third method of the present invention is applicable to even a per-subband CSI reporting method. In this case, the UE may select and report a preferred CSI-RS port configuration of each subband. Therefore, the number of antenna ports of the CSI-RS port configuration selected in each subframe may be different. However, since the direction of the beam cannot be differentiated only in some subbands, a constraint may be set such that the number of antenna ports of the CSI-RS port configuration selected in each subband is equally selected. That is, the number of antenna ports of the CSI-RS port configuration selected in each subband may be equally selected.

Alternatively, even in the per-subband CSI reporting method, a preferred CSI-RS port configuration is equally selected in all subbands and the UE may report CSI corresponding thereto. That is, the RANK and the preferred CSI-RS port configuration are selected and reported in the full band and the PMI and the CQI may be reported subband by subband.

In summary, the UE according to the present invention may report the CSI to the base station through the following configuration.

First, the UE receives configuration information of a first CSI process indicating first CSI for N (N being a natural number greater than 1) antenna ports and a second CSI process indicating second CSI for some of the N antenna ports from the base station. At this time, the UE may receive configuration information of a plurality of different CSI processes together with the first CSI process and the second CSI process. For example, configuration information of a plurality of CSI processes indicating different antenna port configurations as shown in Tables 5 to 7 may be received.

At this time, the base station may perform data signal transmission using N antennas or may perform data signal transmission using greater than N antenna ports. In other words, the base station may transmit, to the UE, configuration information of a first CSI process indicating first CSI for all supportable antenna ports or configuration information of a first CSI process indicating first CSI for some of supportable antenna ports.

The UE calculates the first CSI and the second CSI based on the first CSI process and the second CSI process. At this time, when the configuration information of the CSI processes other than the first CSI process and the second CSI process is also received, the UE may calculate CSI corresponding to the other CSI processes.

As another example, the UE may select only some of the plurality of CSI processes configured by the base station and calculate only CSI for the selected CSI processes.

The UE reports the CSI (e.g., the first CSI and the second CSI) calculated using the above-described methods to the base station. At this time, the CSI may be transmitted to the base station using various methods. For example, the CSI may be transmitted through a PUCCH or a PUSCH.

If the CSI is transmitted through the PUCCH, the CSI calculated based on the CSI processes may be transmitted through different PUCCHs. For example, the first CSI may be transmitted through a first PUCCH and the second CSI may be transmitted through a second PUCCH.

Alternatively, when the CSI is transmitted through the PUSCH, the CSI calculated based on the CSI processes may be transmitted through the same PUSCH. For example, the first CSI and the second CSI may be transmitted through the same PUSCH.

At this time, the plurality of CSI processes (e.g., the first CSI process and the second process) may share the same CSI-RS (reference signal) resources or may share the same CSI-RS resources and CSI-IM (interference measurement) resources.

In addition, the ratios of PDSCH EPRE to CSI-RS EPRE applied to the plurality of CSI processes (e.g., the first CSI process and the second CSI process) may be different from each other.

In addition, when the base station supports a plurality of cross-polarization antennas as shown in FIG. 12, the antenna ports corresponding to a specific CSI process may include the equal numbers of slash ports and backslash ports.

The base station, which has received the CSI according to different antenna port configurations (e.g., number, index, etc.), may determine antenna port configurations (e.g., number, index, etc.) for transmitting a PDSCH to a specific UE based on the received CSI.

4. Device Configuration

Figure 13:
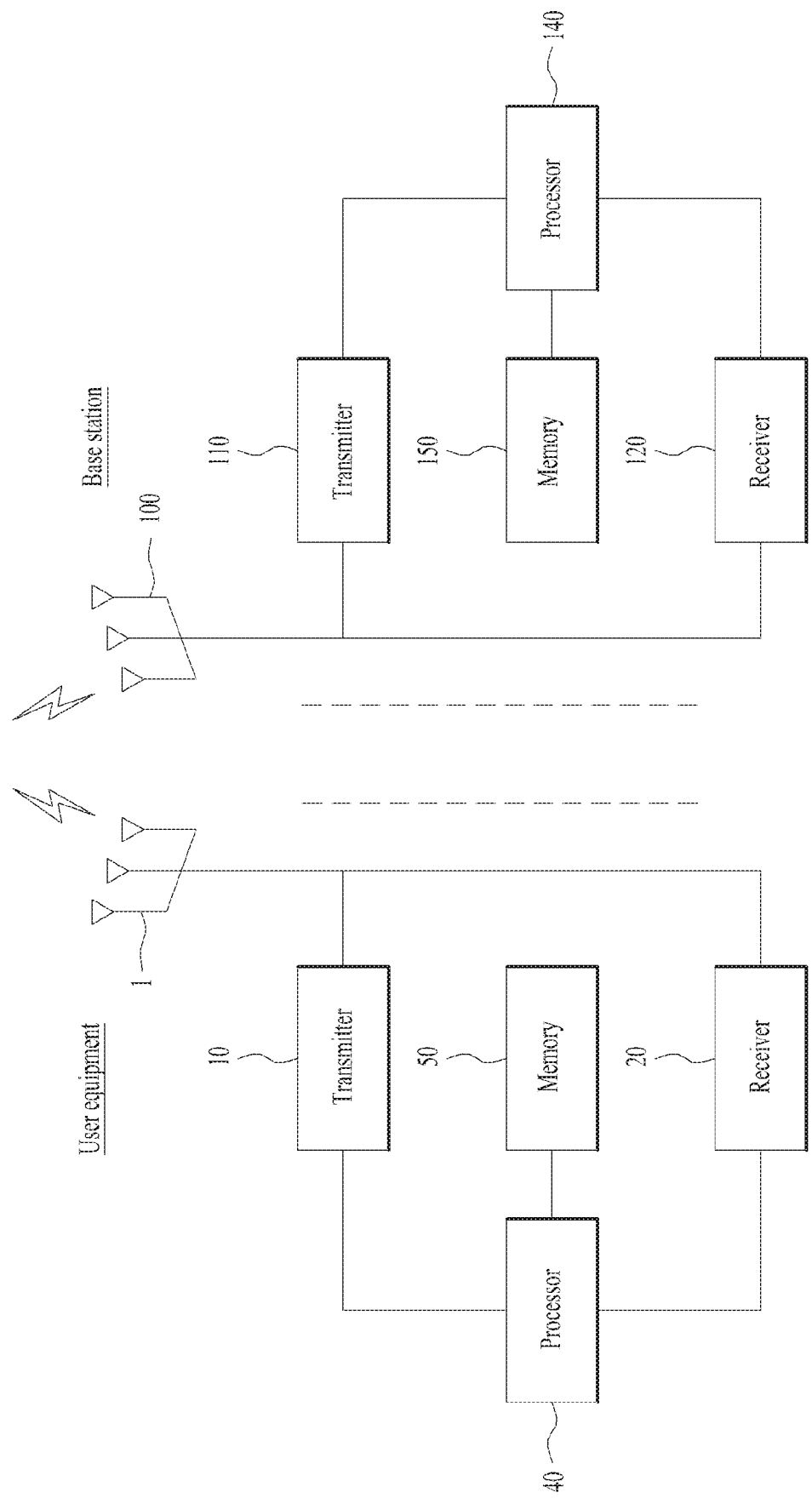
FIG. 13 is a view showing the configuration of a UE and a base station, in which the proposed embodiments may be implemented.

FIG. 13 is a diagram illustrating configurations of a UE and a base station capable of being implemented by the embodiments proposed in the present invention. The UE and the base station shown in FIG. 13 operate to implement the embodiments of the method for reporting CSI between the UE and the base station.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE having the above-described configuration may be configured to receive first downlink control information indicating whether a scheduling type of uplink signal transmission of one or more subframes is a first scheduling type or a second scheduling type from the base station through the processor 40, to transmit an uplink signal in one or more subframes configured based on a reception time of the first downlink control information when the first downlink control information indicates the first scheduling type, and to receive second downlink control information indicating uplink signal transmission of the one or more subframes from the base station and to transmit the uplink signal in one or more subframes configured based on a reception time of the second downlink control information when the first downlink control information indicates the second scheduling type.

The base station having the above-described configuration may be configured to transmit first downlink control information indicating whether a scheduling type of uplink signal transmission of one or more subframes is a first scheduling type or a second scheduling type to the UE through the processor 40, to receive an uplink signal in one or more subframes configured based on a reception time of the first downlink control information when the first downlink control information indicates the first scheduling type, and to transmit second downlink control information indicating uplink signal transmission of the one or more subframes to the UE and to receive the uplink signal in one or more subframes configured based on a reception time of the second downlink control information when the first downlink control information indicates the second scheduling type.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 13 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2680 or 2690 and executed by the processor 2620 or 2630. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of reporting channel state information (CSI) at a user equipment (UE) to a base station in a wireless communication system, the method comprising:
receiving, from the base station, configuration information of a first CSI process indicating first CSI for N antenna ports and a second CSI process indicating second CSI for M antenna ports among the N antenna ports, where N is a natural number greater than 1 and M is a natural number smaller than N;
determining the first CSI and the second CSI based on the first CSI process and the second CSI process,
wherein the first CSI is determined based on a first ratio of physical downlink shared channel (PDSCH) energy per resource element (EPRE) to channel state information reference signal (CSI-RS) EPRE, the first ratio being determined based on a configured offset value,
wherein the second CSI is determined based on a second ratio of PDSCH EPRE to CSI-RS EPRE, the second ratio being determined based on (i) a ratio of N to M and (ii) the configured offset value, and
wherein, based on the first CSI including (i) a first rank indicator (RI), (ii) a first precoding matrix indicator (PMI), and (iii) a first channel quality indicator (CQI) and the second CSI including (iv) a second RI, (v) a second PMI and (vi) a second CQI:
the first RI and the second RI are determined as a common RI determined based on the first CSI process,
the first PMI and the first CQI are determined based on (i) the common RI and (ii) the first CSI process, and
the second PMI and the second CQI are determined based on (ii) the common RI and (ii) the second CSI process; and
reporting the first CSI and the second CSI to the base station.

2. The method of claim 1, wherein the first CSI process and the second CSI process share the same CSI-RS resources.

3. The method of claim 1, wherein the first CSI process and the second CSI process share the same CSI-RS resources and CSI-interference measurement (IM) resources.

4. The method of claim 1,
wherein M is equal to N/2 and the M antenna ports include the equal numbers of slash ports and backslash ports among cross-polarization antennas.

5. The method of claim 1, further comprising:
receiving, from the base station, configuration information of a third CSI process indicating third CSI for L antenna ports among the N antenna ports, where L is a natural number smaller than N;
determining the third CSI based on the third CSI process; and
reporting the third CSI to the base station,
wherein antenna ports relating to the second CSI process and the third CSI process are different from each other.

6. A method of receiving channel state information (CSI) from a user equipment (UE) at a base station in a wireless communication system, the method comprising:
transmitting, to the UE, configuration information of a first CSI process indicating first CSI for N antenna ports and a second CSI process indicating second CSI for some of the N antenna ports, where N is a natural number greater than 1 and M is a natural number smaller than N; and
receiving the first CSI and the second CSI from the UE,
wherein the first CSI is determined based on a first ratio of physical downlink shared channel (PDSCH) energy per resource element (EPRE) to channel state information reference signal (CSI-RS) EPRE, the first ratio being determined based on a configured offset value,
wherein the second CSI is determined based on a second ratio of PDSCH EPRE to CSI-RS EPRE, the second ratio being determined based on (i) a ratio of N to M and (ii) the configured offset value,
wherein, based on the first CSI including (i) a first rank indicator (RI), (ii) a first precoding matrix indicator (PMI), and (iii) a first channel quality indicator (CQI) and the second CSI including (iv) a second RI, (v) a second PMI and (vi) a second CQI:
the first RI and the second RI are determined as a common RI determined based on the first CSI process,
the first PMI and the first CQI are determined based on (i) the common RI and (ii) the first CSI process, and
the second PMI and the second CQI are determined based on (ii) the common RI and (ii) the second CSI process.

7. The method of claim 6, further comprising:
determining the number of antenna ports for transmitting a PDSCH to the UE based on the first CSI and the second CSI.

8. A user equipment (UE) for reporting channel state information (CSI) to a base station in a wireless communication system, the UE comprising:
a transmitter;
a receiver; and
a processor connected to the transmitter and the receiver to operate,
wherein the processor is configured to:
receive, from the base station, configuration information of a first CSI process indicating first CSI for N antenna ports and a second CSI process indicating second CSI for M antenna ports among the N antenna ports, where N is a natural number greater than 1 and M is a natural number smaller than N;
determine the first CSI and the second CSI based on the first CSI process and the second CSI process, wherein the first CSI is determined based on a first ratio of physical downlink shared channel (PDSCH) energy per resource element (EPRE) to channel state information reference signal (CSI-RS) EPRE, the first ratio being determined based on a configured offset value, wherein the second CSI is determined based on a second ratio of PDSCH EPRE to CSI-RS EPRE, the second ratio being determined based on (i) a ratio of N to M and (ii) the configured offset value, wherein, based on the first CSI including (i) a first rank indicator (RI), (ii) a first precoding matrix indicator (PMI), and (iii) a first channel quality indicator (CQI) and the second CSI including (iv) a second RI, (v) a second PMI and (vi) a second CQI:

the first RI and the second RI are determined as a common RI determined based on the first CSI process, the first PMI and the first CQI are determined based on (i) the common RI and (ii) the first CSI process, and the second PMI and the second CQI are determined based on (ii) the common RI and (ii) the second CSI process; and report the first CSI and the second CSI to the base station.

9. A base station for receiving channel state information (CSI) from a user equipment (UE) in a wireless communication system, the base station comprising:

a transmitter;

a receiver; and a processor connected to the transmitter and the receiver to operate, wherein the processor is configured to:

transmit, to the UE, configuration information of a first CSI process indicating first CSI for N antenna ports and a second CSI process indicating second CSI for M antenna ports among the N antenna ports, where N is a natural number greater than 1 and M is a natural number smaller than N; and receive the first CSI and the second CSI from the UE, wherein the first CSI is determined based on a first ratio of physical downlink shared channel (PDSCH) energy per resource element (EPRE) to channel state information reference signal (CSI-RS) EPRE, the first ratio being determined based on a configured offset value, wherein the second CSI is determined based on a second ratio of PDSCH EPRE to CSI-RS EPRE, the second ratio being determined based on (i) a ratio of N to M and (ii) the configured offset value, wherein, based on the first CSI including (i) a first rank indicator (RI), (ii) a first precoding matrix indicator (PMI), and (iii) a first channel quality indicator (CQI) and the second CSI including (iv) a second RI, (v) a second PMI and (vi) a second CQI:

the first RI and the second RI are determined as a common RI determined based on the first CSI process, the first PMI and the first CQI are determined based on (i) the common RI and (ii) the first CSI process, and the second PMI and the second CQI are determined based on (ii) the common RI and (ii) the second CSI process.

* * * * *